United States Patent Office 2,896,901
Patented July 28, 1959

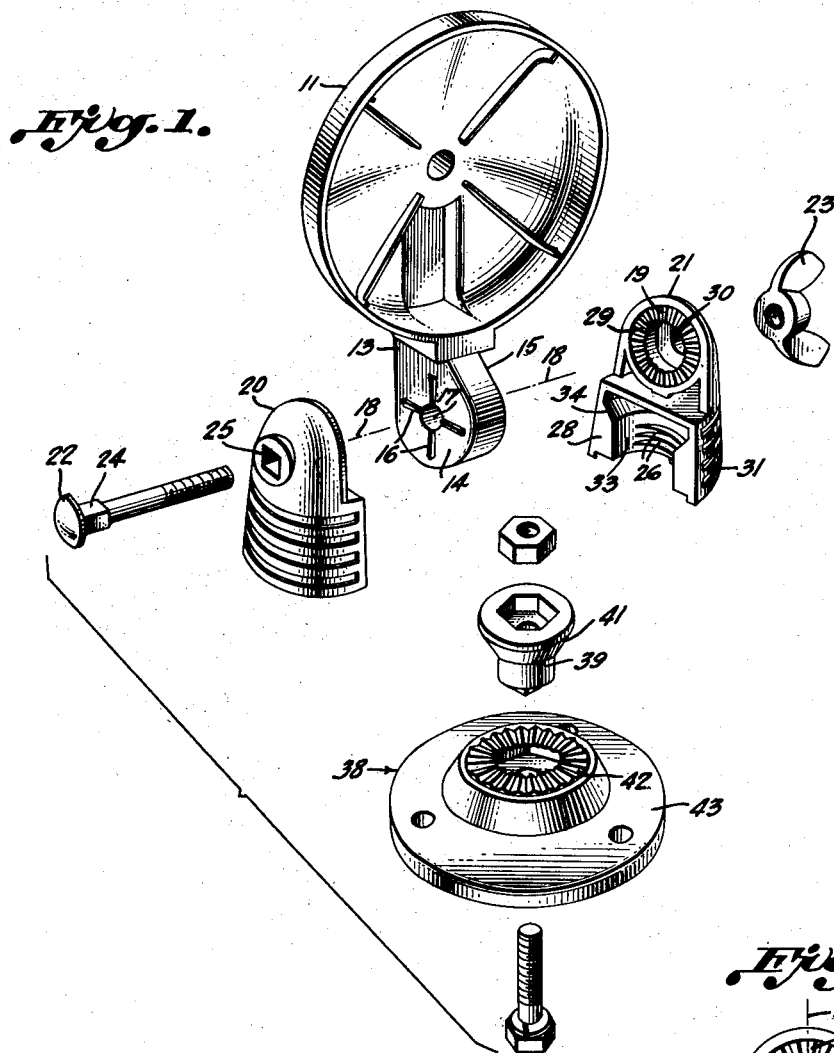
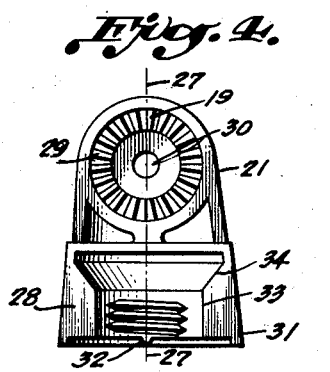

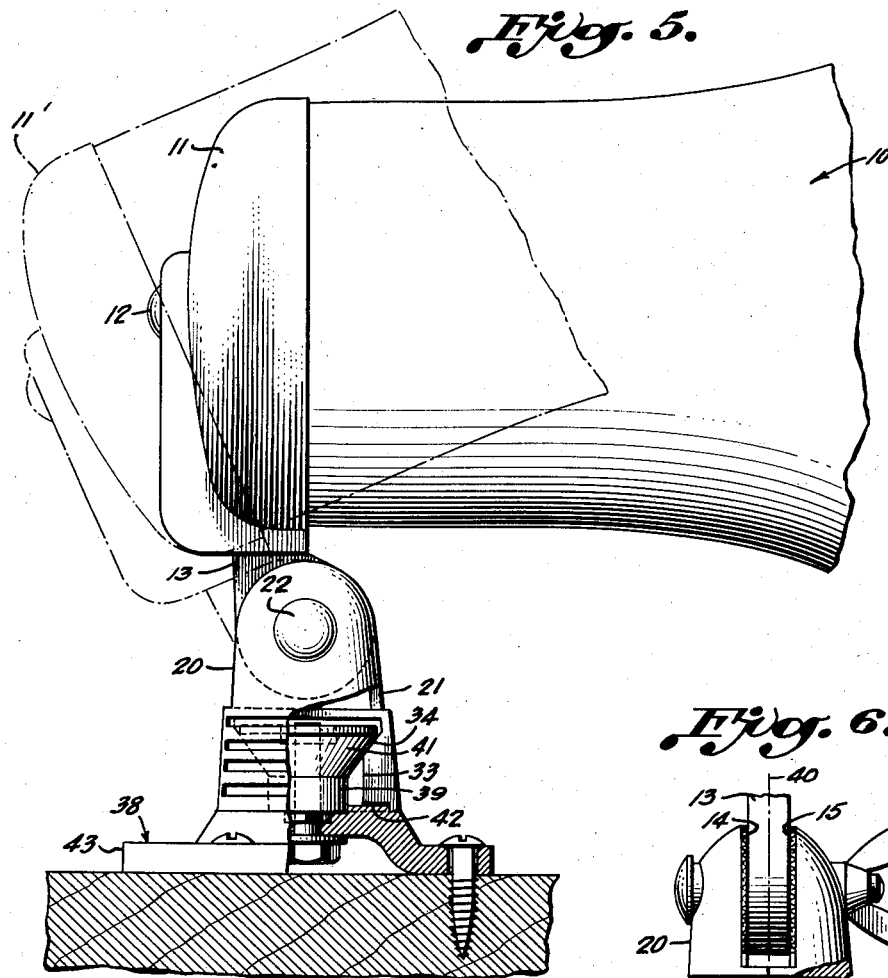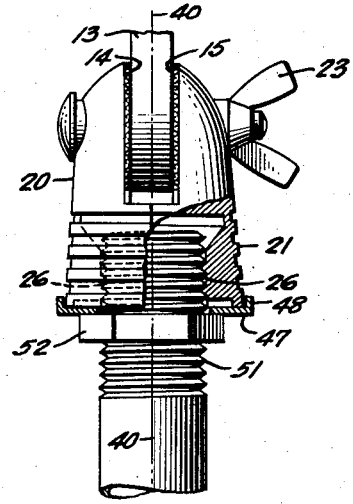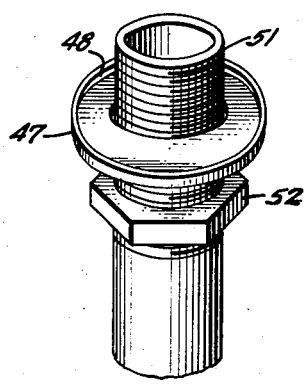

2,896,901

UNIVERSAL BRACKET

Sidney E. Levy and Bernard C. Sharp, White Plains, N.Y., assignors to University Loudspeakers, Inc., White Plains, N.Y., a corporation of New York Application April 2, 1957, Serial No. 650,270

9 Claims. (Cl. 248—278)

This invention relates to universal mounting brackets for loudspeakers or analogous devices requiring mounting in a specifically directed manner, and in particular to a bracket which can simultaneously be swivelled around each of two perpendicular axes and tightened by a single screw and affixed to a structure by either one of two alternative arrangements.

It is a problem in the semi-permanent mounting of loudspeakers or the like on difficult-to-reach beams and ceilings to fasten them at the angle desired for optimum distribution of sound.

In the instant invention, a bracket base is affixed, as by screws, on any accessible surface without any regard for the angle at which the base is oriented or the angle at which the loudspeaker is to be directed. The mounting of the base of the bracket is thus entirely independent of the loudspeaker orientation. The parts of the bracket are then placed around the base, and by the use of one bolt the entire assembly is completed and the loudspeaker is locked in any selected position. In order to interlock the mating surfaces in a more positive manner than with friction, serrations may be used on such surfaces, which permit a plurality of closely spaced angular positions.

It is an object of this invention to provide an easily mounted universal bracket, usable for fastening and directing a loudspeaker or similar beam-directing device in any desired direction.

More specifically, it is an object to affix a device rigidly in any one of a plurality of closely spaced angular positions around each of two mutually perpendicular axes.

In another embodiment of this invention, a cup washer is substituted for the base, and the assembly is mounted on the end of a piece of threaded pipe or rod.

It is another object to provide a universal bracket for attaching a loudspeaker or the like to the end of a threaded pipe and directing it in any desired direction.

The invention will be better understood from the drawings, in which

Fig. 1 is an exploded perspective view of the parts of a mounting bracket arranged for fastening to a flat surface by means of a base member having an enlarged top;

Fig. 2 is a perspective view of a base having a threaded top;

Fig. 3 is a perspective view showing a pipe mounting substituted for the base member of Fig. 1;

Fig. 4 is a side elevation of one of the clamping members 21 which may be used with any one of the three embodiments of the invention;

Fig. 5 is a side elevation, with parts in section, of the assembled bracket of Fig. 1 fastened to a flat surface and a loudspeaker supported on the bracket assembly;

Fig. 6 is an end elevation, with parts in section, of a modified bracket assembly fastened to the pipe shown in Fig. 3.

Referring to the drawings, the loudspeaker assembly 10 (see Fig. 5) is retained on the rear dished casing 11 by a bolt 12. Turning now to Fig. 1, a tongue 13 depends from the casing 11 having a circular flange concentric about the axis of said casing. The tongue 13 is characterized by a pair of parallel oppositely directed, roughened surfaces 14 and 15. In the specific embodiment shown the roughening consists of serrations, such as 16. The surfaces are disposed around a hole 17 located on an axis 18—18 transverse to the plane in which the tongue 13 extends. The tongue 13 is clamped between a pair of rigid clamping members 20 and 21 by the bolt 22 and the wing nut 23. The bolt has a square shank 24 which is adapted for fitting with a corresponding square hole 25 in one of the clamping members 20, in order to prevent it from turning while tightening the nut 23. The clamping members 20, 21 are substantially identical except for the shape of the holes 25 and 30, and the exact positioning of threads 26, which will be described subsequently.

Considering the clamping member 21 as shown in Figs. 1 and 4, it has a reference plane disposed along a longitudinal axis 27—27 from which the surface 28 is slightly offset and from which the surface 29 is spaced. The surface 28 bounding the hemicylindrical portion is offset slightly from the reference plane in order to insure, regardless of any variations which might occur in the production casting of the parts, that the threads 26 will fully engage those of the pipe 51 or, alternatively, that the conoidal frustum portion 34 will engage its mating portion 41. The surface 29 is adapted to fit against the roughened surface 15 of the tongue 13. It is offset from the reference plane by substantially half the thickness of the tongue 13 and is roughened, as by serrations, one of which is shown at 19, disposed around a transverse axis 18—18. A hole 30 disposed on the transverse axis permits passage of the bolt 22.

A hollow half-cylinder, or hemicylindrical portion, 31 is disposed concentrically around the longitudinal axis 27—27 adjacent to the roughened surface portion 29, the above-described reference plane dividing the basic assembled cylindrical shape into a half-cylinder, by a plane of hemicylindrical partition, slightly offset from the roughened surface. The lower outer end of the hemicylinder is generally flat and perpendicular to the longitudinal axis and is roughened, as by the use of at least one serration 32 thereon. When the clamping members 20, 21 are pressed against the cooperating surfaces 14, 15 of the tongue 13 by the bolt 22, the hemicylindrical portions are joined to form a hollow cylinder, the hollow portion being cylindrical at the outer end as at 33 and annularly undercut at the inner end. This undercut may have the form of a conoidal frustum 34, as shown.

The base as shown consists of a bolt, a base portion 38, a washer, and a nut, but if desired the washer may be formed integrally with the base portion, thus eliminating the need for the bolt and nut. The washer has a substantially cylindrical portion 39 disposed around the longitudinal axis thereof, and the top of the cylindrical portion has an expanded portion, which may have the form of a conoidal frustum 41 having the base outward, for fitting conjugally with the corresponding portion 34 of the hollow cylinder formed by the mating clamping members 20, 21. Alternatively, any offset shape which includes a slanting portion to cause interlocking may be formed on the cylindrical portion 39 to mate with a conjugate shape in such a hollow cylinder to interlock the parts against movement along the longitudinal axis of the washer and base portion. A serrated portion 42 on the base portion 38 is disposed symmetrically around the axis thereof adjacent to the cylindrical portion 39 for fitting with the serrations such as 32 on the lower surfaces of the hemicylindrical portions. An apertured mounting flange 43 extends outwardly from the serrated portion 42.

It may be seen that the bolt 22 provides unitary means for simultaneously interlocking the clamping members 20 and 21 with the tongue 13 at any selected angle around the transverse axis 18—18, and cooperatively pressing the clamping members 20, 21 against the annularly expanded portion 41 of the base, thereby interlocking the serrations 32 of the clamping members with the serrations 42 of the base. Thus, it is possible to affix the cylinder formed by the clamping members 20, 21 to the base at any desired angle around the longitudinal axis thereof and at the same time to fix the angle of casing 11 around the axis 18—18.

In the preferred form of this invention, the conoidal shape is preferred for the mating surfaces of the clamping members and the base, since when the bolt 22 is tightened the force of the clamping members against the conoidal portion of the base will cause them to be directed downwards towards the serrations 42 on the base and thus facilitate the interlocking of the clamping members with the base for optimum rigidity around the longitudinal axis. An assembly of this structure is shown in Fig. 5. An alternative angle of mounting is indicated by the dotted line 11'.

A modification of the mounting assembly is shown in Fig. 2, wherein the top 53 of the base 55 is threaded to mate with the threads 26 in the hollow portion. Serrations 54 are shown for angularly interlocking the parts as before.

Another modification of the mounting assembly is achieved by substituting the washer and pipe assembly of Figs. 3 and 6 for the base 38 of Fig. 1. A plurality of uniformly spaced threads 26 of a selected size is formed on the inside of each clamping member, the threads on one side being offset from those of the other side by half the difference between threads. A standard pipe thread size may be used. The threads may extend around only part of the circumference on each side, being disposed principally in the bottom of the hollow portion, in order to facilitate die casting or molding. When the two hemicylindrical portions are joined by the pressure of the bolt 22, a split nut is formed.

The cup washer 47 has a skirt 48 with an inner diameter having a value such as to clear the lower outer diameter of the clamping members 20, 21, and an inside diameter to clear the threads of a pipe or rod 51. The vertical axis of this assembly is indicated by the line 40—40. The skirt of the washer is adapted to fit over the split nut formed by the assembly of the clamping members 20 and 21, and thus forms a non-expandable nut. A threaded pipe or rod 51 is screwed into the threads 26 and yieldably secured at any desired angle around the longitudinal axis of the pipe, as by a lock-nut 52. Alternatively, the cup washer may be omitted, unless extreme strength of mounting is required.

The invention has been described as embodied in a loudspeaker, though it is to be understood that the same construction is usable for other devices, such as a sound pickup device, a searchlight, or any other device requiring a universally adjustable, semi-permanent, or permanent mounting.

The drawings and description are to be taken generally as illustrative rather than restrictive on the broad invention. Various changes may be made in manufacture, such as different locations of the casting parting surfaces, and the like.

We claim:

1. A universal bracket for mounting a loudspeaker to a plurality of base forms, comprising a tongue depending from and integral with a dished casing having a circular flange concentric about the axis of said casing, said tongue having a pair of parallel, roughened surfaces disposed around a second axis; a pair of rigid clamping members, each having a longitudinal axis and a reference plane disposed generally along this axis, and also having a transverse axis in a line perpendicular to the longitudinal axis thereof; a roughened surface portion on each clamping member disposed around said transverse axis in a plane parallel to the reference plane, said roughened surfaces on said clamping members being adapted to fit coaxially over said roughened surfaces on the tongue; a hollow generally hemicylindrical portion on each of said clamping members disposed concentrically around the longitudinal axis thereof subjacent to the roughened surface portion, having a plane of hemicylindrical partition substantially in said reference plane; and means for interchangeably affixing said hollow portions to any one of a plurality of base forms, said means including a bolt extending through said clamping members and said tongue, the axis of said casing being at right angles to the axis of said tongue.

2. A universal bracket for mounting a device of the type described, comprising a tongue depending from the device havnig a pair of parallel, oppositely directed surfaces disposed around an axis and roughened by serrations; a pair of rigid clamping members, each having a longitudinal axis, a reference plane disposed generally along this axis, and also having a transverse axis in a plane perpendicular to the longitudinal axis thereof; a portion of each clamping member being roughened by serrations disposed around said transverse axis in a plane parallel to the reference plane and offset therefrom, said roughened surfaces on said clamping members being adapted to fit coaxially over the roughened surfaces on the tongue; a hole in each of said clamping members and said tongue disposed along said transverse axis; a hollow generally hemicylindrical portion on each clamping member disposed concentrically around the longitudinal axis thereof subjacent to said roughened surface portion, said clamping members when assembled having a plane of hemicylindrical partition lying substantially in the reference plane; the lower outer end of each hemicylindrical portion being generally flat and perpendicular to said longitudinal axis, and having at least one serration thereon; a bolt disposed in the holes along said transverse axis for pressing the roughened surfaces of the clamping members onto cooperation surfaces of the tongue and for joining the hemicylindrical portions to form a hollow cylinder, the hollow portion thereof being cylindrical at the outer end and undercut at the inner end in the form of a conoidal frustum; a base including a substantially cylindrical portion disposed about a longitudinal axis, the top or upper part of the cylindrical portion being expanded into the shape of a conoidal frustum with its base uppermost and adapted for fitting within the conoidally undercut portions of said hollow cylinder, a serrated portion on said base member symmetrically disposed around said axis adjacent to said cylindrical portion and adapted to fit the serrations on the hemicylindrical portions of said clamping members, and a flange portion extending from said serrated portion, whereby said bolt provides unitary means for interlocking said clamping members with said tongue at any selected angle around said transverse axis and cooperatively presses the annular undercut portion of the clamping members against the conoidal portion of said base, thereby pressing the serrations in the cylinder against those in the base and affixing the cylinder rigidly in any selected position around said longitudinal axis.

3. A universal bracket for mounting a device of the type described, comprising a tongue depending from the device having a pair of parallel, oppositely directed, roughened surfaces disposed around an axis; a pair of rigid clamping members, each having a longitudinal axis and a reference plane disposed generally along this axis, and also having a transverse axis in a line perpendicular to said longitudinal axis; a roughened surface portion on each clamping member disposed around said transverse axis in a plane parallel to said reference plane, said roughened surfaces on said clamping member being adapted to fit coaxially over said roughened surfaces on said tongue; a hollow generally hemicylindrical portion on each of said clamping members disposed concentrically around said longitudinal axis subjacent to the roughened surface portion, said clamping members when assembled having a plane of hemicylindrical partition lying substantially in said reference plane; said hollow portion having an interior annular undercut; said hollow portion being substantially cylindrical; a base including a substantially cylindrical supporting member, the top or upper part of the cylindrical member being expanded into the shape of a conoidal frustum with its base uppermost and adapted for fitting within the undercut portions of said hollow portions; means for interlocking said hemicylindrical portions in predetermined positions upon said supporting member comprised of at least one serration on one member and a conjugate array of serrations on the opposing member; and a clamping bolt disposed along said transverse axis whereby cooperatively to clamp the coaxially fitted surfaces of said rigid members to those on said tongue at any selected angle around said transverse axis, and at the same time to interlock said rigid members to said supporting member at any desired angle around said longitudinal axis.

4. A universal bracket for mounting a device of the type described, comprising a tongue depending from the device having a pair of parallel, oppositely directed, roughened surfaces disposed around an axis; a pair of rigid clamping members, each having a common longitudinal axis when assembled, a reference plane in which said axis is disposed, and also having a transverse axis in a line perpendicular to said longitudinal axis; a roughened surface portion on each clamping member disposed around said transverse axis in a plane parallel to said reference plane, said roughened surfaces on said clamping members being adapted to fit coaxially over said roughened surfaces on said tongue; a hollow generally hemicylindrical portion on each clamping member disposed concentrically around said longitudinal axis subjacent to said roughened surface portion, said clamping members when assembled having a plane of hemicylindrical partition substantially in said reference plane; each of said hollow portions having an annular undercut; having a base including a substantially cylindrical supporting member, the top or upper part of the cylindrical member being expanded into the shape of a conoidal frustum with its base uppermost and adapted for fitting within the undercut portions of said hollow portions; means for interlocking said hemicylindrical portions in predetermined positions upon said supporting member comprised of at least one serration on one member and a conjugate array of serrations on the opposing member; and a bolt disposed along said transverse axis whereby cooperatively to clamp the coaxially fitted surfaces of the rigid members to those of the tongue at any selected angle around said transverse axis, and at the same time to interlock said hemicylindrical portions with said supporting member at any selected angle around said longitudinal axis.

5. A universal bracket for mounting a device of the type described comprising a tongue depending from the device having a pair of parallel, oppositely directed, roughened surfaces disposed around an axis; a pair of rigid clamping members, each having a longitudinal axis and a reference plane disposed generally along this axis, and also having a transverse axis in a line perpendicular to said longitudinal axis; a roughened surface portion on each clamping member disposed around said transverse axis in a plane parallel to said reference plane, said roughened surfaces on said clamping member being adapted to fit coaxially over said roughened surfaces on said tongue; a hollow generally hemicylindrical portion on each of said clamping members disposed concentrically around said longitudinal axis subjacent to said roughened surface portion, said clamping members when assembled having a plane of hemicylindrical partition lying substantially in said reference plane; said hollow portion being substantially cylindrical and having a plurality of portions of threads of a selected size therein, the lower end of said hemicylindrical portion being perpendicular to said longitudinal axis; a clamping bolt disposed along said transverse axis to cooperatively clamp the coaxially fitted, roughened surfaces of said clamping members in any selected angle around said transverse axis and to clamp said rigid members together to form a split nut; a cup washer having a skirt with an inner diameter having a value such as to clear the outer diameter of the clamped split nut, the skirt of the washer being fitted over the split nut to form a non-expandable nut, a threaded support and an opening in said washer having a diameter to clear a preselected thread size on said threaded support; said split nut being adapted to embrace said threaded support and a separate lock nut received on said threaded support to bear against the lower surface of said cup washer to yieldably secure the split nut at any desired angle around said longitudinal axis.

6. A rigid clamping member for use in a universal mounting bracket for alternative interlocked serration and locked thread connection to a supporting base structure, said clamping member having a longitudinal axis, a reference plane, said longitudinal axis being disposed generally in said plane, and said clamping member also having a transverse axis in a plane perpendicular to said longitudinal axis; a portion of said clamping member being roughened by serrations disposed around said transverse axis in a plane parallel to said reference plane; a hole in said clamping member disposed about said transverse axis; a hollow generally hemicylindrical portion disposed concentrically around said longitudinal axis subjacent to the roughened surface portion, having a plane of hemicylindrical partition lying in the reference plane; the interior surface of said hollow portion having an annular undercut and a substantially hemicylindrical portion with a plurality of portions of selected threads therein; and the lower end of the hemicylindrical portion being perpendicular to said longitudinal axis and having at least one serration therein.

7. A clamping member as described in claim 6, characterized by the annular undercut having the general shape of a conoidal frustum with the base thereof directed towards the inner end of the hollow portion.

8. A supporting element for use in a universal mounting bracket of the type described, including a substantially cylindrical portion having a longitudinal axis, the top of the cylindrical portion having an annular expanded offset portion for interlocking with a conjugal member, a base portion surrounding said cylindrical portion, a serrated portion in said base portion extending in a plane at right angles to and disposed symmetrically around the axis of said cylindrical portion adjacent to the lower part of the cylindrical portion, and a mounting flange extending outwardly from said base portion substantially at right angles to said longitudinal axis.

9. A base member as described in claim 8, characterized by the annular offset having a generally conoidal frustum shape.

References Cited in the file of this patent

UNITED STATES PATENTS

| | | |
|---|---|---|
| 365,158 | Van Duzer | June 21, 1887 |
| 448,028 | Hall | Mar. 10, 1891 |
| 750,675 | Michelin | Jan. 26, 1904 |
| 948,326 | Hesse | Feb. 8, 1910 |
| 1,182,123 | Wells | May 9, 1916 |
| 2,526,070 | Early | Oct. 17, 1950 |
| 2,617,619 | Versen | Nov. 11, 1952 |
| 2,789,458 | Skeisvoll | Apr. 23, 1957 |

FOREIGN PATENTS

| | | |
|---|---|---|
| 414,428 | France | June 17, 1910 |